UNITED STATES PATENT OFFICE.

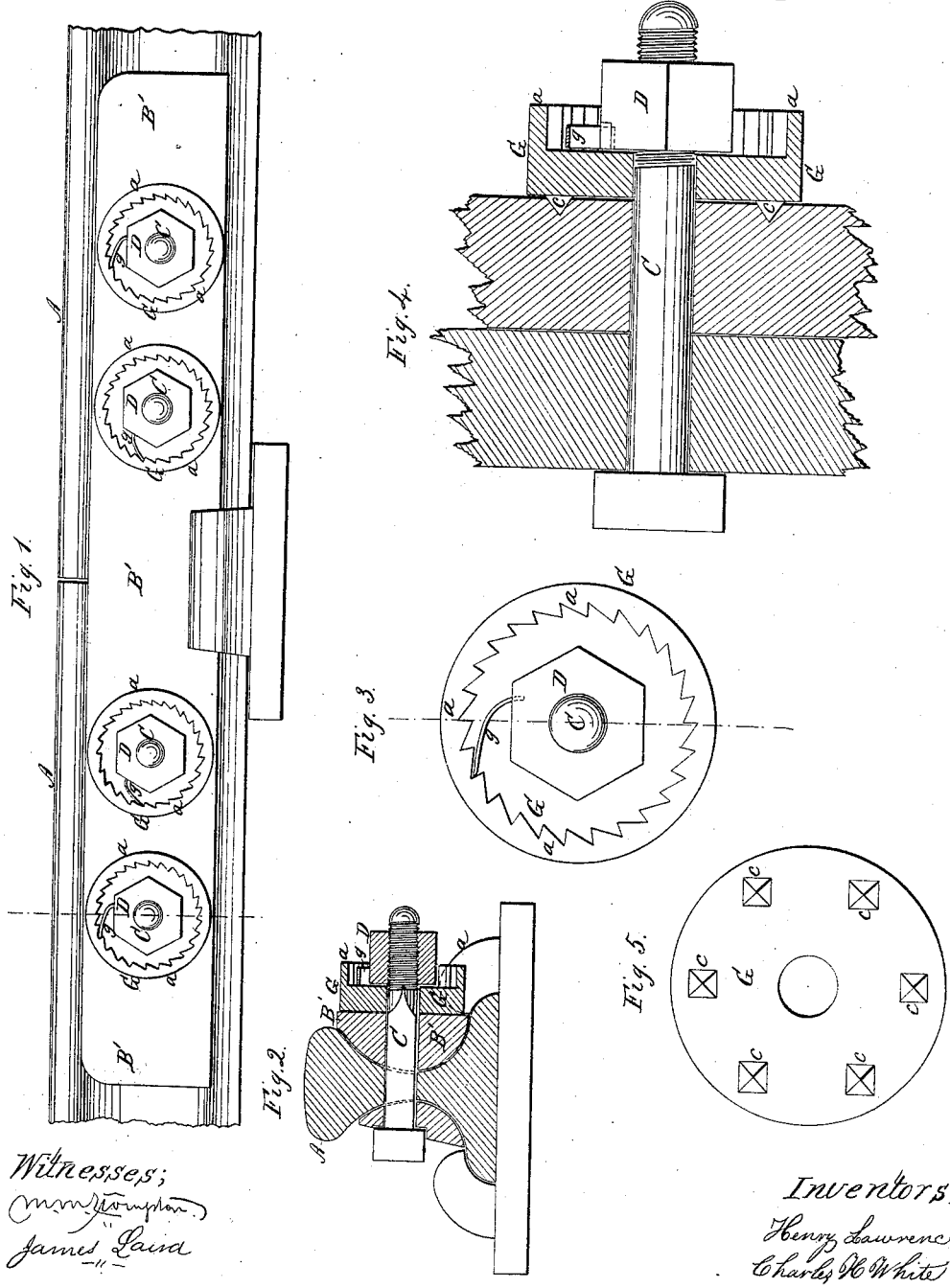

H. LAWRENCE AND C. H. WHITE, OF MELROSE, NEW YORK.

LOCK FOR NUTS OF RAILROAD-BOLTS.

Specification of Letters Patent No. 32,880, dated July 23, 1861.

*To all whom it may concern:*

Be it known that we, HENRY LAWRENCE and CHARLES H. WHITE, of Melrose, in the county of Westchester and State of New York, have invented a new and Improved Method of Locking the Nuts on Railroad-Rail Bolts; and we do hereby declare that the following is a full, clear, and exact description thereof, reference being had to the accompanying drawings, making a part of this specification, in which—

Figure 1, is a side view of two ends of a rail road rail bolted together, wherein the nuts on the bolts are locked by our improved device. Fig. 2. shows a transverse section through the rail at a point where a bolt passes through it. Fig. 3. is an enlarged view showing the washer which is used in locking the nuts and the attachment of the nut thereto. Fig. 4. is a transverse section through a washer having spikes on its back. Fig. 5. shows the back of the washer of Fig. 4.

Similar letters of reference indicate corresponding parts in the several figures.

The object of our invention is to prevent the nuts, on bolts, which are used to secure strengthening bars on each side of the joints of railroad rails, from wearing loose in consequence of the jarring and concussions occasioned by the passing and repassing of trains over the rail.

The nature of our invention consists in interposing washers between the nuts and fishing bars and securing the nuts to said washers by spring pawls, on the nuts, engaging with ratchet teeth, on the washers, as will be hereinafter described, so that the nuts may be set up when desired, but will be effectually prevented from turning loose.

To enable those skilled in the art to make and use our invention we will proceed to describe its construction and operation.

In the accompanying drawings A. A. represent the ends of two sections of a common T railroad rail and B. B'. are fishing bars which are formed in the usual manner to fit snugly against each side of the rails and to extend some distance on each side of the joint thereof for the purpose of strengthening the rail table and preventing the ends of the rails from springing either upward, downward or laterally.

C. C. C. C. are the bolts having angular heads, which pass transversely through holes made through the bars B. B'. and the neck of the rails A. A. and which are to receive nuts D. D. D. D. on their ends, on which screw threads are cut in the usual manner for the purpose of securing the bars B. B'. rigidly to the rails. These bolts and nuts are made in the usual manner and indeed our invention can be readily applied to the old bolts and nuts which are at present in use.

G. G. G. G. represent circular cast iron washers which are flat on one side and have an annular flange *a*, projecting from the other side. Around the inside surface of each flange ratchet teeth are formed as shown in Figs. 1. 2. 3 and 4, of the drawings. The flanges *a*, on the washers G. G. project out a half inch or more or less and the inside diameter of these annular flanges should be somewhat larger than the nuts which are used on the bolts. The nuts D. may be made square, octagonal, or of any suitable shape; and in one of the sides of each nut a deep groove is cut into which is inserted one end of a strong steel spring *g*, which is somewhat longer than the space between the nut and ratchet teeth on the flange *a*, and it is therefore bent so that its free end will engage with the ratchet teeth. This spring, or springs, for one or more may be used, forms the lock for connecting the nuts D. with the washer G. and while it will allow the nut to be turned in a direction for setting it farther on the bolt, the spring will not allow the nut to be turned backward or unscrewed.

The bolts C. are passed transversely through the bars B. B'. and through longitudinal slots through the necks of the rails A. A and the heads of these bolts are recessed into one of the bars as shown in Fig. 2, of the drawings, so that the bolts themselves will not turn. The washers are now shipped on the ends of the bolts with their ratchet flanges *a*, *a*, outward, and brought up against the bar on this side of the rails. The nuts D. with their springs *g*, are now screwed on the bolts and set up tightly against the washers by a screw wrench. These washers, on account of their large bearing surface will not be liable to turn and as the nuts are secured to the washers and the whole are set up tightly against the side of the bar a perfect lock will be formed which while it will admit of the nuts being set up tighter will not turn backward.

If it is found desirable spikes c, c, may be cast or otherwise formed on the backs of the washers as shown in Figs. 4 and 5, of the drawings, which may be driven into indentations made in the fishing bars for effectually preventing the washers from turning or being turned while on the bolts and against the bar B'. For wood-work the spikes c, c, c, on the washers G. G. G. will be found desirable, but for iron-work the points c, c, c, will not be necessary.

In order to take a nut off one of the bolts the spring g, must be broken out, which can be done by a slight tap with a chisel and as the springs are only slipped loosely in the grooves in the nuts another spring can be used to again apply the nut as before.

Having thus described our invention what we claim as new and desire to secure by Letters Patent is—

The washers G. G. G. having annular ratchet teeth flanges a, formed on them in combination with the springs or pawls g, which are secured to the nuts D. substantially as and for the purposes herein set forth.

HENRY LAWRENCE.
CHARLES H. WHITE.

Witnesses:
M. M. LIVINGSTON,
JAMES LAIRD.